United States Patent

[11] 3,627,712

[72] Inventor Henry J. Leibu
Wilmington, Del.
[21] Appl. No. 815,488
[22] Filed Apr. 11, 1969
[45] Patented Dec. 14, 1971
[73] Assignee E. I. du Pont de Nemours and Company
Wilmington, Del.

[54] ACCELERATORS FOR ELASTOMERS IN CONTACT WITH POLYESTER FIBERS
11 Claims, No Drawings

[52] U.S. Cl. .................................................. 260/5,
152/330, 156/110 A, 161/191, 161/231, 260/4 R, 260/79.5 B, 260/873
[51] Int. Cl. ........................................................... C08c 11/66, B32b 27/36, C08d 13/00
[50] Field of Search ............................................ 260/5, 873, 79.5, 79.5 B, 783; 161/191, 231

[56] References Cited
UNITED STATES PATENTS

| | | | |
|---|---|---|---|
| 3,554,857 | 2/1971 | Barton .......................... | 161/231 |
| Re. 20,411 | 6/1937 | Romieux et al. ............... | 260/783 |
| 2,879,243 | 3/1959 | Anderson ...................... | 260/79.5 B |
| 3,308,103 | 3/1967 | Coran et al. ................... | 260/79.5 |
| 3,400,106 | 9/1968 | Morita ........................... | 260/79.5 |
| 3,411,970 | 11/1968 | Perrin ........................... | 260/5 |
| 3,419,521 | 12/1968 | Scott et al. ..................... | 260/79.5 |
| 3,496,152 | 2/1970 | Morita et al. .................. | 260/79.5 |
| 3,502,603 | 3/1970 | Gallagher et al. ............. | 161/231 |

Primary Examiner—John C. Bleutge
Attorney—Raymond E. Blomstedt

ABSTRACT: A vulcanization accelerator for hydrocarbon backbone sulfur-curable elastomers which can be used in elastomer formulations in contact with a fibrous polyester material without causing deterioration of the polyester material. The accelerator can be (1) A thioperoxydiphosphate of the formula:

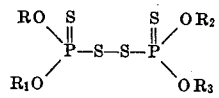

(2) A zinc phosphorodithioate of the formula:

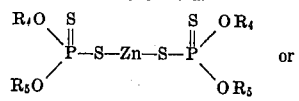

or (3) A basic zinc phosphorodithioate of the formula:

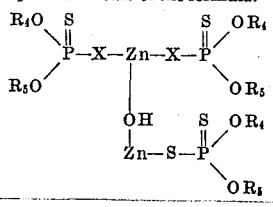

where R, $R_1$, $R_2$, $R_3$, $R_4$, and $R_5$ can independently be alkyl, cycloalkyl, alkenyl, and aralkyl having 3–20 carbon atoms.

A promoter which does not yield during vulcanization or on aging a primary or secondary amine or amine fragments can be used with the accelerator.

ACCELERATORS FOR ELASTOMERS IN CONTACT WITH POLYESTER FIBERS

BACKGROUND OF THE INVENTION

This invention relates to a vulcanization accelerator system particularly suitable for sulfur vulcanization of natural and synthetic elastomer stocks in the presence of a fibrous polyester material.

Elastomer-containing articles often are reinforced with fibrous strands or fabrics. Examples of such articles include tires, conveyor and transmission belts and hoses. Automobile tires have been in the past reinforced with cotton, rayon, and nylon cords and fabrics, but more recently polyester fiber tire cords have become increasingly more important. Polyester cords have some interesting and desirable properties, such as good strength and dimensional stability. However, in spite of the superior properties of tires built with polyester cords, some tires suffer from the disadvantage that the polyester cords tend to deteriorate rapidly at the very high temperatures encountered in severe service. Much of this deterioration can be attributed to the presence in the elastomer in contact with the cords of some of the conventional vulcanization accelerators or their derivatives which promote chemical attack on the ester linkages of the fibers. This chemical weakening of polyester fibers is known in the elastomer industry as "tendering."

Because of the growing use of polyester fibers for tire cords and for reinforcing various other elastomer-containing articles, there is a need for a vulcanization accelerator system which does not cause polyester tendering.

SUMMARY OF THE INVENTION

Applicant has found that sulfur-curable elastomers which have a hydrocarbon backbone can be readily vulcanized with sulfur in the presence of zinc oxide and a fibrous polyester without causing tendering of the fibers, by using an accelerator of one of the following formulas:

1. a thioperoxydiphosphate (I)

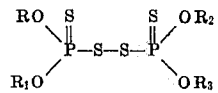

2. a zinc phosphorodithioate (II)

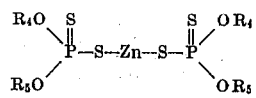

and 3. a basic zinc phosphorodithioate (III)

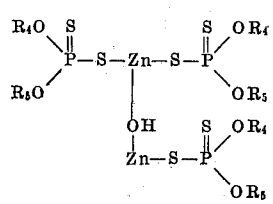

where $R$, $R_1$, $R_2$, $R_3$, $R_4$, and $R_5$ can individually be alkyl, cycloalkyl, alkenyl, and aralkyl having three to 20 carbon atoms.

A vulcanization promoter which does not during vulcanization or on aging generate a primary or secondary amine or amine fragments can be used with the accelerator.

DETAILED DESCRIPTION OF THE INVENTION

Thioperoxydiphosphates, zinc phosphorodithioates, or basic zinc phosphorodithioates are primary vulcanization accelerators in the process of this invention. They will hereafter be referred to simply as accelerators. The second ingredient, which is optional (a promoter which does not yield a primary or secondary amine or amine fragments), is a secondary accelerator. A promoter is sometimes used to regulate the cure rate of a primary accelerator; usually a promoter increases the cure rate considerably, a synergistic effect often being observed.

The organic substituents of the thioperoxydiphosphate ester groups ($R$, $R_1$, $R_2$, and $R_3$) and of the zinc phosphorodithioate and basic phosphorodithioate ester groups ($R_4$ and $R_5$) include alkyl groups, such as propyl and isopropyl, butyl, isobutyl, and t-butyl, pentyl, hexyl, octyl, nonyl, undecyl, dodecyl, hexadecyl, and octadecyl; alkenyl groups such as propenyl, butenyl, 5-hexenyl, 10-undecenyl, and 9-octadecenyl; cycloalkyl groups such as cyclopentyl, cyclohexyl, and cyclooctyl; and aralkyl groups, such as benzyl, methylbenzyl, phenethyl, phenylbutyl, naphthylmethyl, and naphthylethyl. The preferred substituents have three to five carbon atoms.

The thioperoxydiphosphates can be made by oxidation of 0,0-disubstituted phosphorodithioates, for example, with halogens, nitrogen oxides, or sodium peroxide. Mixtures of two different 0,0-disubstituted phosphorodithioates can be oxidized to thioperoxydiphosphates having $R$ and $R_1$ different from $R_3$ and $R_4$. Various methods of making thioperoxydiphosphates are known in the art. Both normal and basic zinc phosphorodithioates also are well known.

The amount of vulcanization accelerator used in the process of this invention is about 0.2–5.0 parts by weight per 100 parts of elastomer for effective curing. The preferred amount is 0.5–3.0 parts as providing the best vulcanizates.

Applicant has discovered that vulcanization accelerators which split off primary or secondary amines or fragments thereof during vulcanization or on aging adversely affect polyester fiber strength. Although the exact manner in which this tendering occurs is not well understood, there appears to be a relationship between the loss of strength of the fiber and the basicity of the amine. The steric configuration of the amine fragment also is important, the larger the steric factor the smaller the effect of the curing agent on polyester fiber strength. Weakening of polyester cords in tires often is accompanied by loss of adhesion between the cord and the elastomer and a consequent delamination.

Any vulcanization accelerator which does not split off a primary or secondary amine or amine fragments during the vulcanization process or on aging can be used as a promoter in the process of this invention. Representative promoters include 2-mercaptobenzothiazole and its zinc, ferric, and cupric salts; and 2,2'-dithiodibenzothiazole. The choice of a promoter will to some extend depend on the chemical structure of each elastomer and its curing characteristics.

The amount of the promoter is about 0.02–3 parts by weight per 100 parts of elastomer. No more than the minimum amount required for obtaining a satisfactory rate of cure should be used since a faster cure is often accompanied by a decrease in processing safety.

Sulfur-curable elastomers which have a hydrocarbon backbone can be vulcanized by the process of this invention in the presence of a fibrous polyester composition without tendering the polyester material. Among the elastomers which can be vulcanized by this process are: natural rubber; synthetic polyisoprene; styrene/butadiene copolymers (SBR); acrylonitrile/butadiene copolymers (nitrile rubber or NBR); and terpolymers of ethylene and propylene with a nonconjugated diene having no more than one readily polymerizable double bond such as 1,4-hexadiene, 5-ethylidene-2-norbornene, 5-methylene-2-norbornene, and dicyclopentadiene. These terpolymers are generally called EPDM elastomers.

Fibrous polyester compositions which can be employed in the process of this invention are those conventionally used in reinforcing rubber articles. Generally, they are linear polyesters which have recurring structural units of the formula

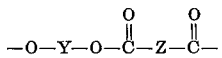

where Y is a divalent organic radical containing about 2–18 carbon atoms and attached to the adjacent oxygen atoms by saturated carbon atoms. Representative Y radicals include ethylene, trimethylene, tetramethylene, pentamethylene, hexamethylene, 1,10-decylene, phenylenedimethylene, cyclohexylenedimethylene, and oxybisethylene. Z is a divalent hydrocarbon radical containing about 2–18 carbon atoms. Representative Z radicals include 1,4-phenylene; 1,3-phenylene; hexamethylene; 1,4-cyclohexylene; bisphenylene; decamethylene and octamethylene. The most commercially important polyester is poly(ethylene terephthalate) where Y is ethylene and Z is 1,4-phenylene. However, other polyesters and their mixtures can be used in the process of this invention.

Polyester fibers may be used in the form of monofilaments, yarns, cords, or fabrics, depending on the particular application. The methods of fabricating various articles in which elastomers are reinforced with textile materials are well known to those skilled in the art.

Elastomer stocks are compounded using standard rubber compounding techniques and conventional equipment, for example, a rubber mill or a Banbury mixer. Sulfur, which is the vulcanizing agent, is present in the amount of 0.2–3.0 parts by weight per 100 parts of elastomer. Zinc oxide is present in the amount of 2–10 parts. Zinc oxide somewhat accelerates a sulfur cure and is believed to take part in regenerating the accelerator from its complex with sulfur. Other ingredients can include antioxidants, processing aids and extenders (such as petroleum oils and plasticizers), pigments and fillers (such as carbon black, clay and titanium dioxide).

Vulcanization rates and processing safety obtained with accelerator systems of the present invention compare favorably with those generally observed in conventional cures, such as, for instance, with sulfenamide compounds.

The process of the present invention often improves not only the polyester fiber strength but also the adhesion of polyester fibers to elastomers.

The experimental procedures involved in the preparation of test samples and evaluation of tire cords are described below. All parts, proportions and percentages both in the specification and in the claims are by weight, unless otherwise indicated.

SAMPLE PREPARATION AND TESTING

I. Polyester Tire Cord Coating Composition
A. Preparation of First Coating Composition A slurry is prepared in the following manner: Add 0.24 lb. of a paste containing 75 percent by weight of dioctyl sodium sulfosuccinate and 25 percent water (commercially available from American Cyanamid Company as "Aerosol OT") to 6.26 lbs. of warm water and mix at slow speed until completely dissolved (approximately 5 minutes are required). Add the solution obtained to 16 lbs. of water at room temperature while mixing at slow speed. To the resulting solution add 7.50 pounds of diphenyl ester of 4,4'-methylenedicarbanilic acid (a "blocked" diisocyanate commercially available from Du Pont), and mix at slow speed until completely dispersed. Add the resulting composition to a 4.6-gallon ball mill containing approximately 20 pounds of grinding media. Ball mill the composition on a roller mixer for 72 hours. The resulting composition is ball milled or mixed 1 hour before using in order to assure complete suspension; high-speed mixing is avoided to prevent foaming. The slurry of blocked polyisocyanate contains 25 percent solids.

Add 0.14 pound of an epoxy resin made by condensation of glycerin and epichlorohydrin, the resin having an average molecular weight of about 300 and an epoxide equivalent of 140–160 ("Epon 812," Shell Chemical Company), to 8.37 pounds of water at room temperature and mix slowly. Prepare a solution containing 2 percent solids by adding 5 grams of gum tragacanth to 245 grams of water at room temperature; mix until completely dissolved (approximately 5 minutes required). Add about 0.20 pound of the 2 percent gum solution (freshly mixed) to the epoxy resin-water solution while mixing slowly. Finally, add 1.29 pounds of the blocked isocyanate slurry to the resulting mixture and mix for 3 minutes at slow speed.

This dip is not stable and the solids will settle out very quickly when not agitated or circulated. When in use, the dip must be circulated using a pump or agitated manually every 5 to 10 minutes. For best results this dip should be made fresh every day.

B. Preparation of the Second Coating Composition

A resorcinol-formaldehyde dipping composition is prepared in the following way: 1.38 lbs. of resorcinol, 2.39 lbs. of 1.57 percent aqueous sodium hydroxide, 2.02 lbs. of 37 percent aqueous formaldehyde, and 27.8 lbs. of water (at 75°–78° F.) are stirred together and allowed to age for 6 hours. The resulting composition is mixed with 30.50 lbs. of 41 percent "Gen-Tac" (a terpolymer of butadiene/styrene/2-vinyl pyridine, General Tire and Rubber Company), 7.64 lbs. of water at 75° F. and 1.42 lbs. of 28 percent aqueous ammonium hydroxide. The final composition is allowed to age at least 12 hours before use.

C. Preparation of the Third Coating Composition (Used only with EPDM Elastomers)

A 12.5 percent solids solution is prepared by dissolving chlorosulfonated polyethylene containing about 20 percent chlorine and 1 percent sulfur and 0.1 part per 100 parts of polymer of dinitrotoluene in an 88/12benzene/isopropyl alcohol mixture. Two parts of this solution are then added to 1 part of water containing 8 parts per 100 of polymer of sodium alkylbenzene sulfonate and 0.25 part per 100 of polymer of sodium nitrite in a high shear mixture at 80° C. Solvent is removed from the resulting emulsion with steam at atmospheric pressure to give a latex. After 0.8 part of ammonium alginate has been added for each 100 parts of latex solids, the composition is allowed to cream by standing for several days at room temperature. Typically, a 47.7 percent solids latex results.

Forty grams of resorcinol and 44.2 grams of 35 percent formaldehyde are dissolved in 200 grams of water; then 710 grams of the latex prepared above are added with stirring. The resulting composition is diluted with 981 grams of distilled water and the pH is raised to 7.5 ± 0.1 by addition of sufficient 10 percent aqueous sodium hydroxide solution (typically about 4 grams). The solids content is about 20 percent and may generally be in the range of 20 ± 3 percent. This dip is aged a minimum of 30 hours at 27° C. and can be used for up to 10 days. After 24 hours the pH should be about 6.5, and after 72 hours, 6.0.

II. Coating the Polyester Tire Cord

A poly(ethylene terephthalate) polyester tire cord is employed, having a cord denier of about 3300 (3 yarns of denier 1000 plied into one cord). The polyester fiber used is "Dacron" polyester fiber type 68,available from Du Pont.

The polyester tire cord is dipped in the first coating composition and dried for exactly 1 minute at 425° F. while being stretched 8 percent. The pickup (dry weight) is typically about 0.5 percent. The coated cord is then dipped in the second coating composition and dried for exactly 1 minute at 425° F. without stretching. The pickup (dry weight) of the second coat is typically about 4 percent.

III. Preparation of the Laminates for Testing

A 1-inch wide piece of double-faced pressure-sensitive tape is positioned on each side of the slit in a tire-building drum. A 0.015-inch thick strip of 9×18-inch compounded elastomer stock is positioned at the center of the building drum; the film backing of the strip is removed, and the coated polyester cord is wound on the drum across the full width of the stock using the maximum available number of cords per inch without overlapping the cord. The backing is removed from another 0.015-inch thick 9×18-inch piece of compounded elastomer and the freshly exposed surface is laid against the tire cord on the drum. Care is taken that no air is introduced between the plies. The assembly is smoothed and removed from the drum.

Two warps each 8×9 inches are cut. The cords are parallel to the 8-inch dimension.

A test pad is constructed having a central portion composed of two adjacent warps prepared as described above, separated by two strips of 2×8-inch gray polyester fabric of 840 denier size-free polyester fiber (Du Pont Type 68 Dacron polyester fiber). The pad is then built up symmetrically on each side with a 0.015-inch thick piece of compounded elastomer, a 0.125-inch piece of compounded elastomer, a warp of the gray polyester fabric, and two pieces of 0.125-inch thick compounded elastomer. The completed pad is loaded into a hot 8×9-inch plunger mold and cured at 6 tons for 40 minutes at 150° C.

The cured pad is removed from the mold and aged for 24 hours at 163° C. in a circulating-air environment.

The two outside thicknesses of elastomer are removed to leave the gray fabric pieces exposed. Samples are cut and immersed in a mixture of 50 parts of trichlorotrifluoroethane and 50 parts of Stoddard solvent for 2 days. The samples are then removed and excess solvent is allowed to evaporate for about 1 hour. The cords are carefully removed with pliers and allowed to dry overnight. They are then conditioned at 75 ± 2° F. and 55 ± 2 percent relative humidity for 24 hours.

The polyester cords (in lengths of 3.5 inches) are tested at 25° C. in an Instron tensile tester operated at a crosshead speed of 2 inches per minute. The chart speed is 1 inch per minute. The full-scale load is initially set at 50 lbs. and is increased to 100 lbs. if necessary. The breaking strength in kilograms is calculated by dividing height of the curve by 2.2.

The percentage of tensile strength retained as compared with the tensile strength of the original cord is calculated.

IV. Adhesion Testing

After aging the test laminates for 24 hours at 163° C., the two outside thicknesses of elastomer are removed leaving the gray fabric pieces exposed on each side, and the plies are separated on both ends for at least 1 inch in order to form "tongues" for insertion into a clamp. Pieces 1×7 inches in dimension are cut parallel to the cords, and these pieces are cut in half to give samples 1×3.5 inches. The tongues are inserted into clamps of an Instron tensile tester and the pieces are pulled apart at a 90° angle. The crosshead speed of the tensile tester is 5 inches per minute and the chart speed is 2 inches per minute. The full-scale load is set at 100 pounds.

For comparison, adhesion is measured in the same way using a sample that has not been aged. The force in pounds per linear inch (p.l.i.) required to pull the laminate apart is measured at room temperature and at 140° C.

The invention is illustrated by the following examples:

Example 1

SBR-Natural Rubber Compounding and Tensile Strength and Adhesion Testing

An elastomer stock is compounded by milling on a two-roll rubber mill according to the following recipe:

| Masterbatch | Parts |
|---|---|
| Butadiene-styrene copolymer | 50 |
| Natural rubber (Smoked Sheet No. 1) | 50 |
| High abrasion furnace black | 35 |
| Stearic acid | 1 |
| Naphthenic process oil ("Circosol" 2 X H, Sun Oil Co.) | 10 |
| Antioxidant (diphenylamine—acetone reaction product, "Neozone" L, Du Pont) | 1 |
| Zinc oxide | 3 |
| Sulfur | 2.5 |

| Accelerator Composition | Parts A | Parts B (Control) |
|---|---|---|
| Tetraisopropyl thioperoxydiphosphate | 1.5 | — |
| 2,2'-Dithiodibenzothiazole | 0.5 | 0.25 |
| 2-(Morpholinothio)benzothiazole | — | 1.25 |

The butadiene-styrene copolymer is prepared by copolymerizing 1,3-butadiene and styrene at 6° C. and contains 23.5 percent polymerized styrene.

Test laminates are prepared as described above from the compounded rubber stock and coated polyester tire cord. Each specimen is designed to simulate a two-ply pneumatic tire. After curing and heat aging the test pieces for 24 hours at 163° C., the relative decrease of cord strength is measured with the following results;

| Accelerator Composition | Parts A | B (Control) |
|---|---|---|
| Percent tensile strength retained | 65 | 26 |

The processing safety of elastomer compositions A and B is determined by the Mooney scorch test at 138° C. according to ASTM D 1646–61, using the small rotor. The length of time required for a 10-point rise is the same for both compositions, 19 minutes.

As a further indication of the maintenance of structural strength of polyester cord tires made using the accelerator systems of this invention, the adhesion tests are carried out. The results are shown in the following table:

| Accelerator Composition | A | B (Control) |
|---|---|---|
| Before Aging | Delamination force (pli) | |
| Room Temperature | 74 | 59 |
| At 140° C. | 38 | 34 |
| After Aging | | |
| Room Temperature | 35 | 15 |
| At 140° C. | 20 | 8 |
| Adhesion Retained after Aging | Percent | |
| Room Temperature | 47 | 25 |
| At 140° C. | 53 | 24 |

Example 2

EPDM Resin Compounding and Tensile Strength Testing

A. In this example the elastomer stock is compounded using the following recipe:

| Masterbatch | Parts |
|---|---|
| Elastomer | 100 |
| High abrasion furnace black | 70 |
| Paraffinic oil ("Sunpar" 150, Sun Oil Co.) | 55 |
| Zinc oxide | 5 |
| Stearic acid | 1 |
| Sulfur | 1.25 |

| Accelerator Composition | Parts A | B (Control) |
|---|---|---|
| Zinc 0,0-dibutyl phosphorodithioate | 2 | — |
| Tetramethylthiuram monosulfide | — | 1.5 |
| 2-Mercaptobenzothiazole | 1.5 | 0.75 |

The elastomer used in this example is an EPDM rubber prepared by copolymerizing ethylene, propylene, and 1,4-hexadiene in solution in tetrachloroethylene (at 40° C. with a residence time of 10 minutes) in the presence of a coordination catalyst made by mixing vanadium tetrachloride and diisobutylaluminum monochloride, using a ratio of aluminum to vanadium of 3. The elastomer has a Mooney viscosity (ML 1 + 4 at 250° F.) of about 40. The copolymer analyzes for the following monomer composition: propylene $36 \pm 2$ percent, total hexadiene $3.0 \pm 0.3$ percent, the balance being ethylene. The degree of unsaturation is about 0.28 mole per kilogram.

Laminates are prepared as described above under Sample Preparation and Testing except that the tire cords have a denier of about 3900 (3 yarns of denier 1300 plied into one cord), and a third dip is used. The doubly coated polyester tire cord is dipped into the third coating and dried for 1 minute at 425° F. No stretching is done. The pickup for the third coating is typically about 5 percent based on the weight of the cord.

Curing and testing are carried out as in example 1. The following table shows the percent retention of the tensile strength of the polyester cords.

| Accelerator Composition | A | B (Control) |
| --- | --- | --- |
| Percent tensile strength retained | 83 | 34 |

B. Compounding is done in the same way as in part A, but using the basic zinc 0,0-diisopropyl phosphorodithioate in place of zinc 0,0-dibutyl phosphorodithioate. As a control, a stock having the same accelerator composition as in part A is used. In this test the percent tensile strength retained by the test sample is 79 percent as compared with 26 percent retained by the control.

I claim:

1. A composition comprising: (A) a sulfur-curable elastomer having a hydrocarbon backbone; (B) zinc oxide; (C) sulfur; (D) a vulcanization promoter which does not either during vulcanization or on aging form a primary or secondary amine or an amine fragment; (E) a vulcanization accelerator from the group 1. a thioperoxydiphosphate of the formula

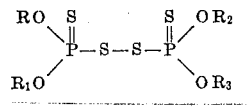

2. a zinc basic phosphorodithioate of the formula

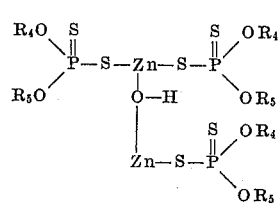

wherein R, $R_1$, $R_2$, $R_3$, $R_4$ and $R_5$ each is independently selected from the group: alkyl, cycloalkyl, alkenyl, cycloalkenyl, and aralkyl radicals containing 3–20 carbon atoms, and (F) a fibrous polyester material.

2. The composition of claim 1 wherein component (F) is a fibrous poly(ethylene terephthalate) material.

3. The composition of claim 1 wherein component (D) is present in the proportion of about 0.02–3.0 parts per 100 parts of sulfur-curable hydrocarbon elastomer.

4. The composition of claim 1, wherein component (B) is present in the proportion of about 2–10 parts; component (C) is present in the proportion of about 0.2–3.0 parts; and component (E) is present in the proportion of about 0.2–5.0 parts; all amounts based on 100 parts of sulfur-curable elastomer.

5. The composition of claim 4, wherein the component (A) is a blend of natural rubber and of a butadiene-styrene copolymer; the component (E) is tetraisopropyl thioperoxydiphosphate; and the component (F) is a fibrous poly(ethylene terephthalate) material.

6. The composition of claim 4, wherein the component (A) is a terpolymer of ethylene and propylene with about 2–6 percent 1,4-hexadiene; the component (E) is basic zinc isopropyl phosphorodithioate; and the component (F) is a fibrous poly(ethylene terephthalate) material.

7. The composition of claim 5 also containing 0.02–3.0 parts of 2,2'-dithiodibenzothiazole per 100 parts of sulfur-curable hydrocarbon elastomer.

8. The composition of claim 6 also containing 0.02–3.0 parts of 2,2'-dithiodibenzothiazole per 100 parts of sulfur-curable hydrocarbon elastomer.

9. In a process for vulcanizing a sulfur-curable elastomer having a hydrocarbon backbone in the presence of a polyester fibrous material, which comprises contacting said elastomer with sulfur in the presence of zinc oxide, a vulcanization promoter which does not either during the vulcanization or on aging form primary or secondary amines or amine fragments and of a vulcanization accelerator, the improvement which consists essentially of employing as the vulcanization accelerator, a compound from the group 1. a thioperoxydiphosphate of the formula

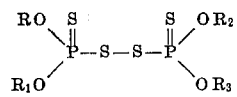

2. a zinc basic phosphorodithiate of the formula

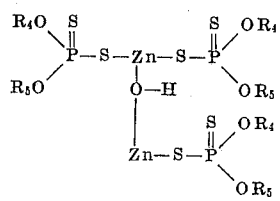

wherein each of R, $R_1$, $R_2$, $R_3$, $R_4$, and $R_5$ contains three to 20 carbon atoms and is independently selected from to group: alkyl, cycloalkyl, alkenyl, cycloalkenyl, and aralkyl radicals.

10. The process of claim 7 where the polyester fibrous material consists essentially of poly(ethylene terephthalate); the vulcanization accelerator is selected from the group: tetrapropyl thioperoxydiphosphate, tetraisopropyl thioperoxydiphosphate, and tetraneopentylthioperoxydiphosphate, and the vulcanization promoter is selected from the group 2-mercaptobenzothioazole and 2,2'-dithiodibenzothiazole.

11. The process of claim 10 where sulfur is present in the proportion of 0.2–3.0 parts; zinc oxide is present in the proportion of 2–10 parts; the vulcanization accelerator is present in the proportion of 0.2–5.0 parts, and the promoter is present in the proportion of 0.02–3.0 parts, all based on 100 parts by weight of the sulfur-curable hydrocarbon elastomer.

* * * * *